United States Patent
Chopra et al.

(10) Patent No.: US 11,205,161 B2
(45) Date of Patent: Dec. 21, 2021

(54) SYSTEM AND METHOD FOR ELECTRONIC RECEIPT SERVICES

(71) Applicant: VISA INTERNATIONAL SERVICE ASSOCIATION, San Francisco, CA (US)

(72) Inventors: Akshay Chopra, Singapore (SG); Matthew Dill, Singapore (SG)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 128 days.

(21) Appl. No.: 16/603,137

(22) PCT Filed: Apr. 4, 2018

(86) PCT No.: PCT/US2018/026061
§ 371 (c)(1),
(2) Date: Oct. 4, 2019

(87) PCT Pub. No.: WO2018/187455
PCT Pub. Date: Oct. 11, 2018

(65) Prior Publication Data
US 2020/0034802 A1 Jan. 30, 2020

Related U.S. Application Data

(60) Provisional application No. 62/482,079, filed on Apr. 5, 2017.

(51) Int. Cl.
*G06Q 20/04* (2012.01)
*G06Q 20/20* (2012.01)

(52) U.S. Cl.
CPC ........ *G06Q 20/047* (2020.05); *G06Q 20/202* (2013.01)

(58) Field of Classification Search
CPC .... G06Q 20/047; G06Q 20/202; G06Q 20/02; G07G 5/00
See application file for complete search history.

(56) References Cited

U.S. PATENT DOCUMENTS

| | | | | |
|---|---|---|---|---|
| 8,392,288 B1* | 3/2013 | Miller | .................... | G06Q 40/02 705/26.81 |
| 8,606,720 B1* | 12/2013 | Baker | ................ | G06Q 20/3674 705/76 |
| 10,482,433 B1* | 11/2019 | Myren | ................ | G06Q 20/0457 |
| 2003/0200184 A1* | 10/2003 | Dominguez | ........ | G06Q 20/4014 705/78 |
| 2006/0282382 A1* | 12/2006 | Balasubramanian | ........ | G06Q 20/4014 705/44 |

(Continued)

OTHER PUBLICATIONS

V. Vadde, Nithya C. H. and A. P. Surhonne, "An NFC based innovation for paperless retail transactions and digital receipts management," 2015 Annual IEEE India Conference (INDICON), 2015, pp. 1-6, doi: 10.1109/INDICON.2015.7443622. (Year: 2015).*

(Continued)

*Primary Examiner* — Ashford S Hayles
(74) *Attorney, Agent, or Firm* — Loeb & Loeb LLP

(57) ABSTRACT

A centralized service or operating system to create receipts, store receipts, access receipts and provide additional services based on receipts is disclosed.

6 Claims, 19 Drawing Sheets

(56) References Cited

U.S. PATENT DOCUMENTS

| | | | | |
|---|---|---|---|---|
| 2007/0164106 | A1* | 7/2007 | McDevitt | G06Q 20/047 235/383 |
| 2007/0255653 | A1* | 11/2007 | Tumminaro | G06Q 20/325 705/39 |
| 2008/0167017 | A1* | 7/2008 | Wentker | G06Q 20/3278 455/414.1 |
| 2011/0125598 | A1* | 5/2011 | Shin | G06Q 20/3278 705/17 |
| 2011/0145082 | A1* | 6/2011 | Hammad | G06Q 20/202 705/24 |
| 2011/0302083 | A1* | 12/2011 | Bhinder | G06Q 20/32 705/44 |
| 2012/0290422 | A1* | 11/2012 | Bhinder | G06Q 20/047 705/21 |
| 2012/0290609 | A1* | 11/2012 | Britt | G06Q 20/327 707/769 |
| 2013/0110659 | A1* | 5/2013 | Phillips | G06Q 20/327 705/24 |
| 2013/0151344 | A1* | 6/2013 | Tavares | G06Q 30/0201 705/14.65 |
| 2013/0262269 | A1* | 10/2013 | O'Leary | G06Q 10/08 705/26.81 |
| 2013/0317924 | A1* | 11/2013 | Bush | H04W 4/80 705/16 |
| 2013/0346221 | A1* | 12/2013 | Rangachari | G06Q 30/0277 705/14.73 |
| 2014/0025521 | A1* | 1/2014 | Alsina | G06Q 30/0601 705/26.1 |
| 2014/0046786 | A1* | 2/2014 | Mazaheri | G06Q 20/206 705/18 |
| 2014/0052617 | A1* | 2/2014 | Chawla | G06Q 10/10 705/39 |
| 2014/0095382 | A1* | 4/2014 | Desai | G06Q 30/06 705/41 |
| 2014/0200997 | A1* | 7/2014 | Anderson | G06Q 30/0229 705/14.53 |
| 2014/0372198 | A1* | 12/2014 | Goldfinger | G06Q 30/0201 705/14.33 |
| 2015/0332415 | A1* | 11/2015 | Johansen | G06Q 40/12 705/30 |
| 2016/0103798 | A1* | 4/2016 | Greenberg | G06F 3/0488 715/738 |
| 2016/0104130 | A1* | 4/2016 | Greenberg | G06Q 20/306 705/16 |
| 2017/0053301 | A1* | 2/2017 | Khan | G06Q 20/322 |
| 2018/0025340 | A1* | 1/2018 | Schlosser | G06Q 20/227 705/24 |
| 2018/0096415 | A1* | 4/2018 | Garris | G06Q 30/0641 |

OTHER PUBLICATIONS

K. T. Wadsworth, M. T. Guido, J. F. Griffin and A. Mandil, "An innovation in paper receipts: the electronic receipt management system," 2010 IEEE Systems and Information Engineering Design Symposium, 2010, pp. 88-93, doi: 10.1109/SIEDS.2010.5469674 . (Year: 2010).*

Matthew DiPaola, and Orrin I Franko. "Receipt-Tracking Apps Keep You Organized." Orthopedics Today 34.5 (2014): 23-. Print. (Year: 2014).*

International Search Report and Written Opinion for PCT/US18/26061, dated Jul. 9, 2018, 12 pages.

* cited by examiner

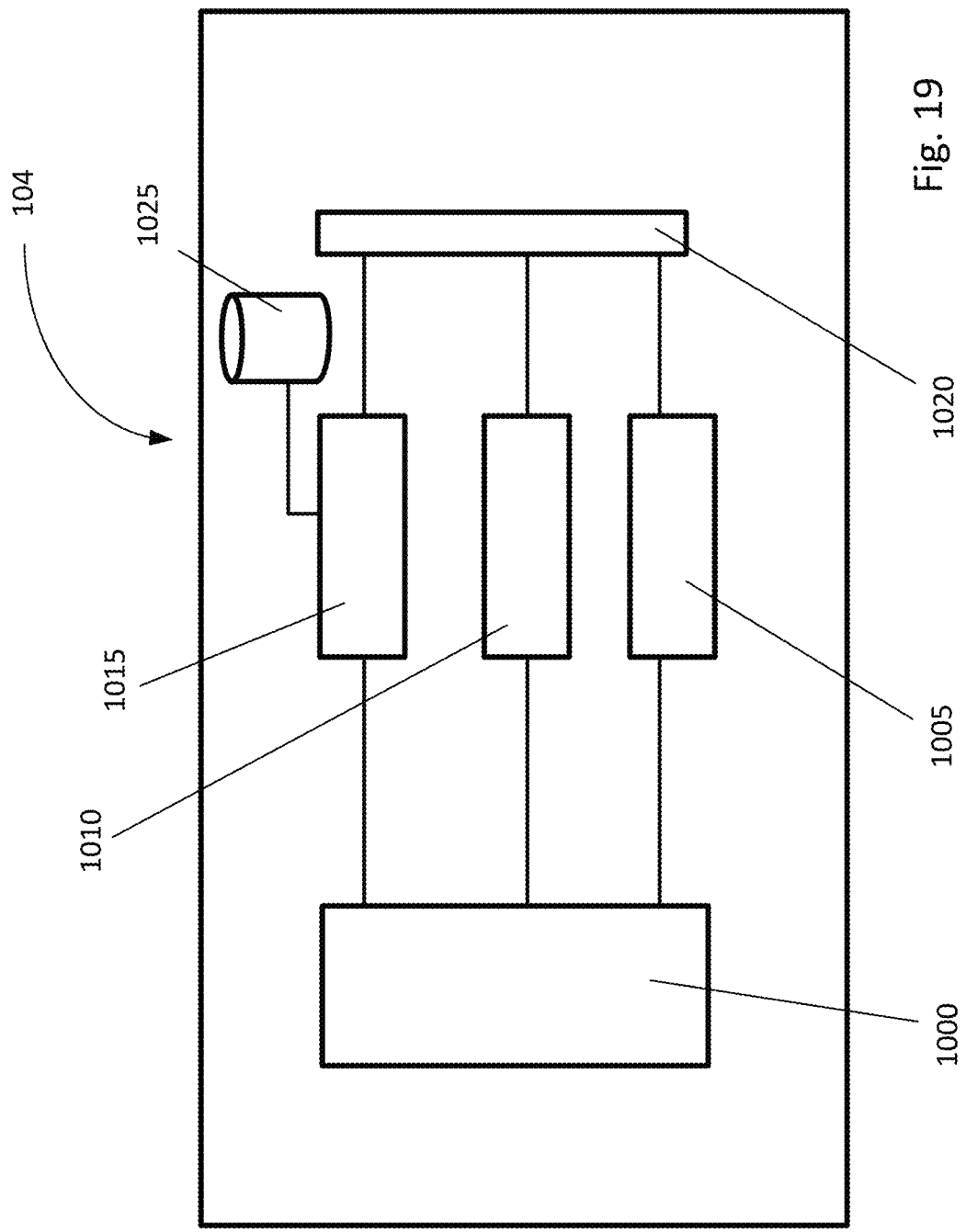

SYSTEM AND METHOD FOR ELECTRONIC RECEIPT SERVICES

BACKGROUND

Receipts for goods and services have been around for a significant period of time. In the electronic economy, some merchants have switched to electronic receipts but the merchant has to create software and hardware to create the electronic receipt. The receipt is of limited use after the sale. In addition, the receipt may be used for a variety of purposes which are logically related to receipts such as loyalty tracking and warranty registration but receipts are not being used for such purposes currently.

SUMMARY

A centralized service which may be thought of as a multi-party platform to create digital receipts is described and disclosed. Once a transaction is triggered, multiple parties ("publishers", such as bankcard issuers, merchants, internet companies, loyalty service providers, etc.) may be notified and may publish custom data onto a digital receipt that the purchaser receives. The structure allows the purchaser to see and interact with communications from various publishers in one place (the receipt), and ensures that different publishers can see only their own data, or data which they've licensed from other publishers. Users can choose what data they'd like to receive in their receipts, and publishers may choose what they'd like to publish (e.g. purchase details, offers, warranty dates, loyalty information, social sharing etc.).

BRIEF DESCRIPTION OF THE DRAWINGS

FIG. 19 may be an illustration of the elements of a sample server computing device.

SPECIFICATION

At a high level, a centralized service which may be thought of as a multi-party platform to create digital receipts. Once a transaction is triggered, multiple parties ("publishers", such as bankcard issuers, merchants, internet companies, loyalty service providers, etc.) may be notified and may publish custom data onto a digital receipt that the purchaser receives. The structure allows the purchaser to see and interact with communications from various publishers in one place (the receipt), and ensures that different publishers can see only their own data, or data which they've licensed from other publishers. Users can choose what data they'd like to receive in their receipts, and publishers may choose what they'd like to publish (e.g. purchase details, offers, warranty dates, loyalty information, social sharing etc.).

The technical problem of tracking receipts over time and related services thereto is addressed by having a centralized service create and save the receipts and enable related widgets to provide additional technical systems to merchants, issuers and users based on the receipts. The receipt operating system may accept commands to widgets and respond with data to parties that have permission to see the data.

Figure 1:
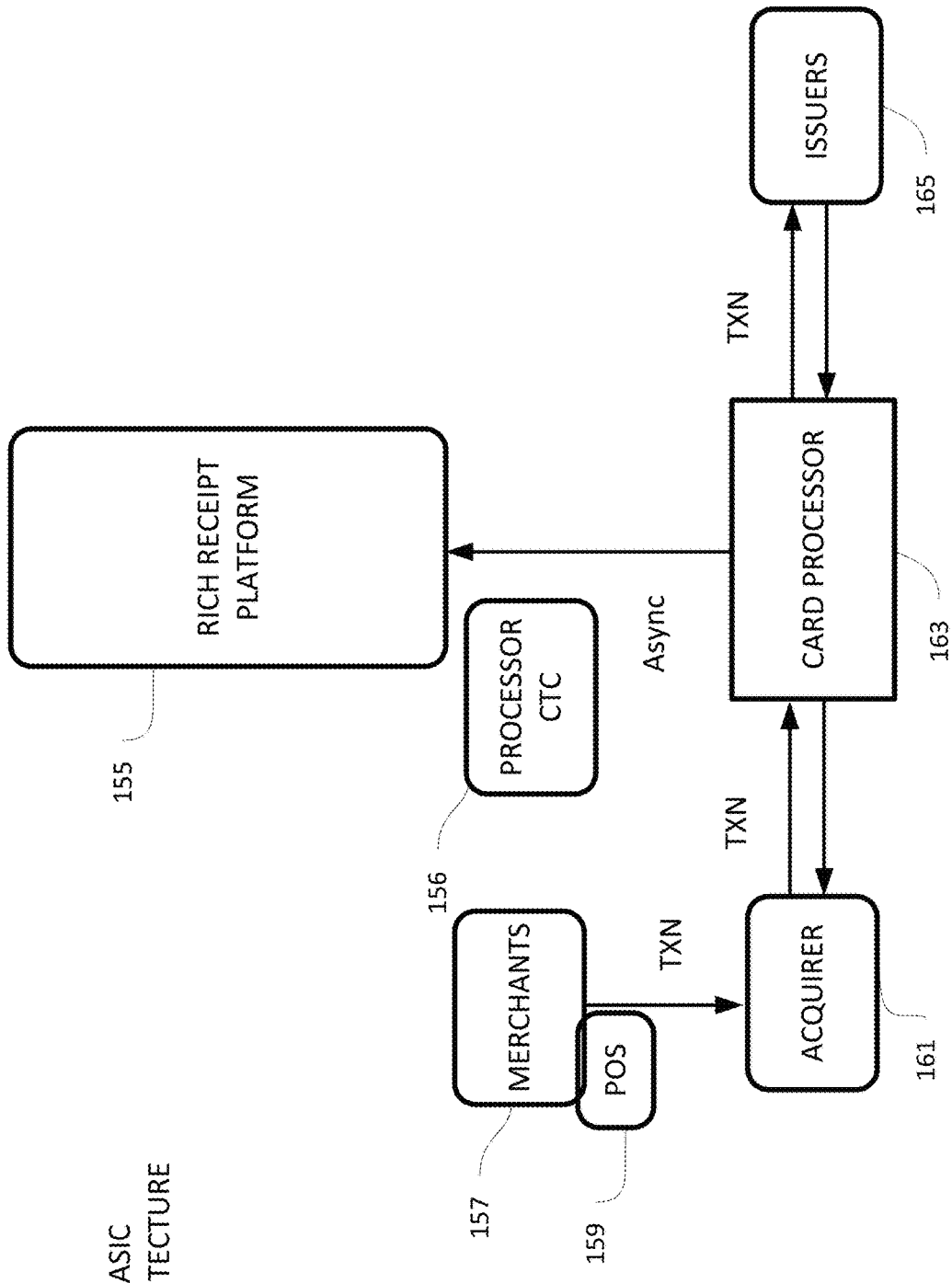
FIG. 1 may be an illustration of the flow of the receipt platform data amount the parties.

Referring to FIG. 1, the parties to the rich receipt platform 155 may be illustrated. The usual parties to an electronic transaction are illustrated including a merchant 157 with a point of sale terminal 159 which may accept transactions. The transactions may be communicated to an acquirer 161 which may communicate the transactions to a card processor 163 where the transactions may be communicated and settled with an account issuer 165. In addition, the transactions may be communicated from the card processor 163 to the rich receipt platform 155 which may review the transactions using payment processor consumer transaction controls (CTC) or the like.

Figure 2:
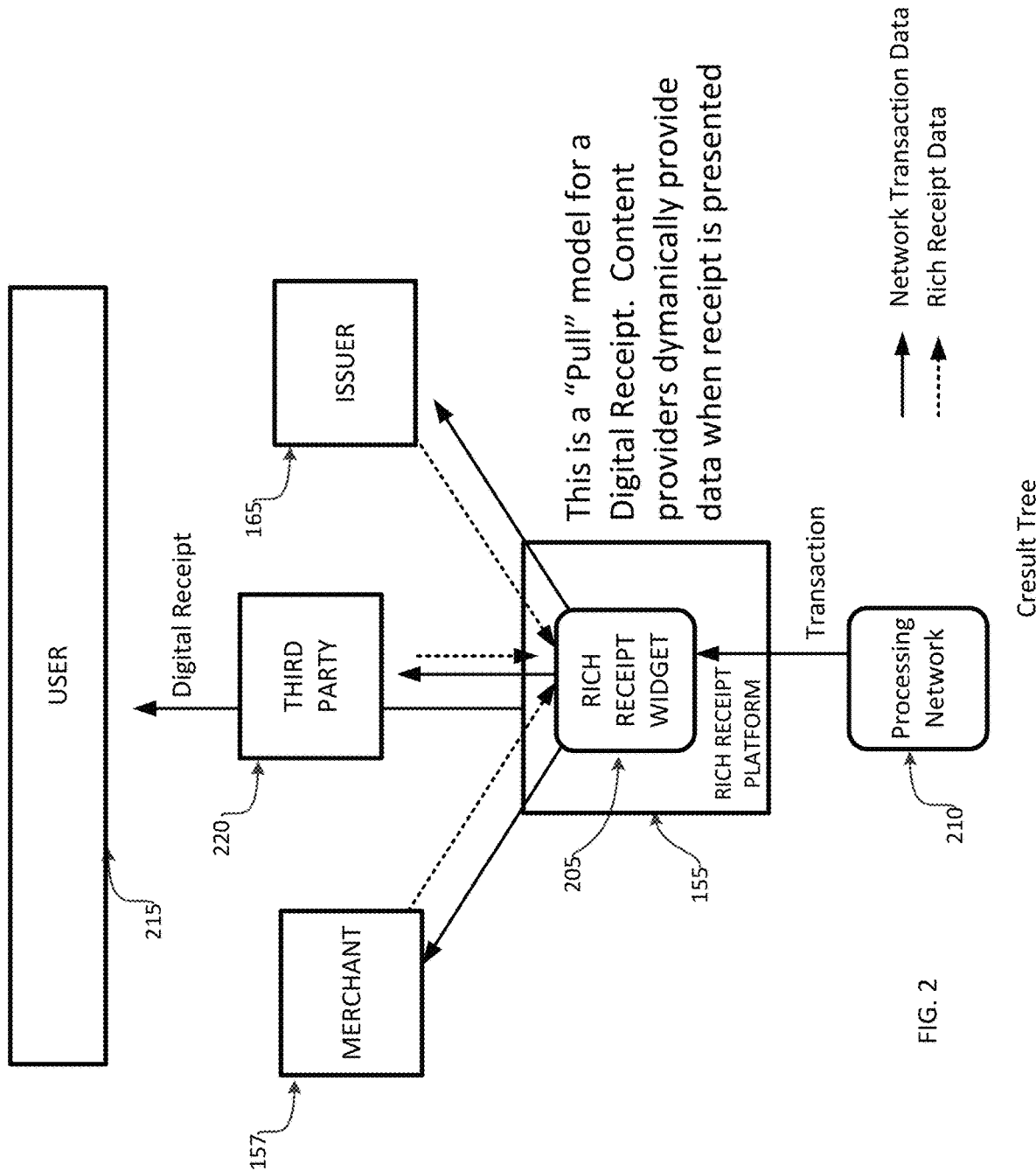
FIG. 2 may be an illustration of a pull based flow of the receipt platform data amount the parties.

FIG. 2 may be another illustration of the parties to the rich receipt platform 155. The platform 155 may include a rich receipt widget 205 which may be a piece of computer executable code that takes in data, performs operations and passes the data along to another party, system or application. The rich receipt widget 205 may take on a variety of forms and provide a variety of functions depending on the system design, the permissions of the party accessing the widget 205 and the desires of the user.

The processing network 210 may pass transaction data to the rich receipt platform 155. The rich receipt platform 155 may be thought of as an operating system which accepts commands and takes actions using widgets. The widgets may include a rich receipt widget 205 which dynamically provides receipt data as needed. The receipt data may be passed to merchants 157, third parties 220 and issuers 165. In addition, users 215 may have access to the rich receipt widget 205. The merchants 157, third parties 220 and issuers 165 may desire to include communications on the electronic receipt and users may select the communications they desire to be included on their electronic receipts.

Figure 3:
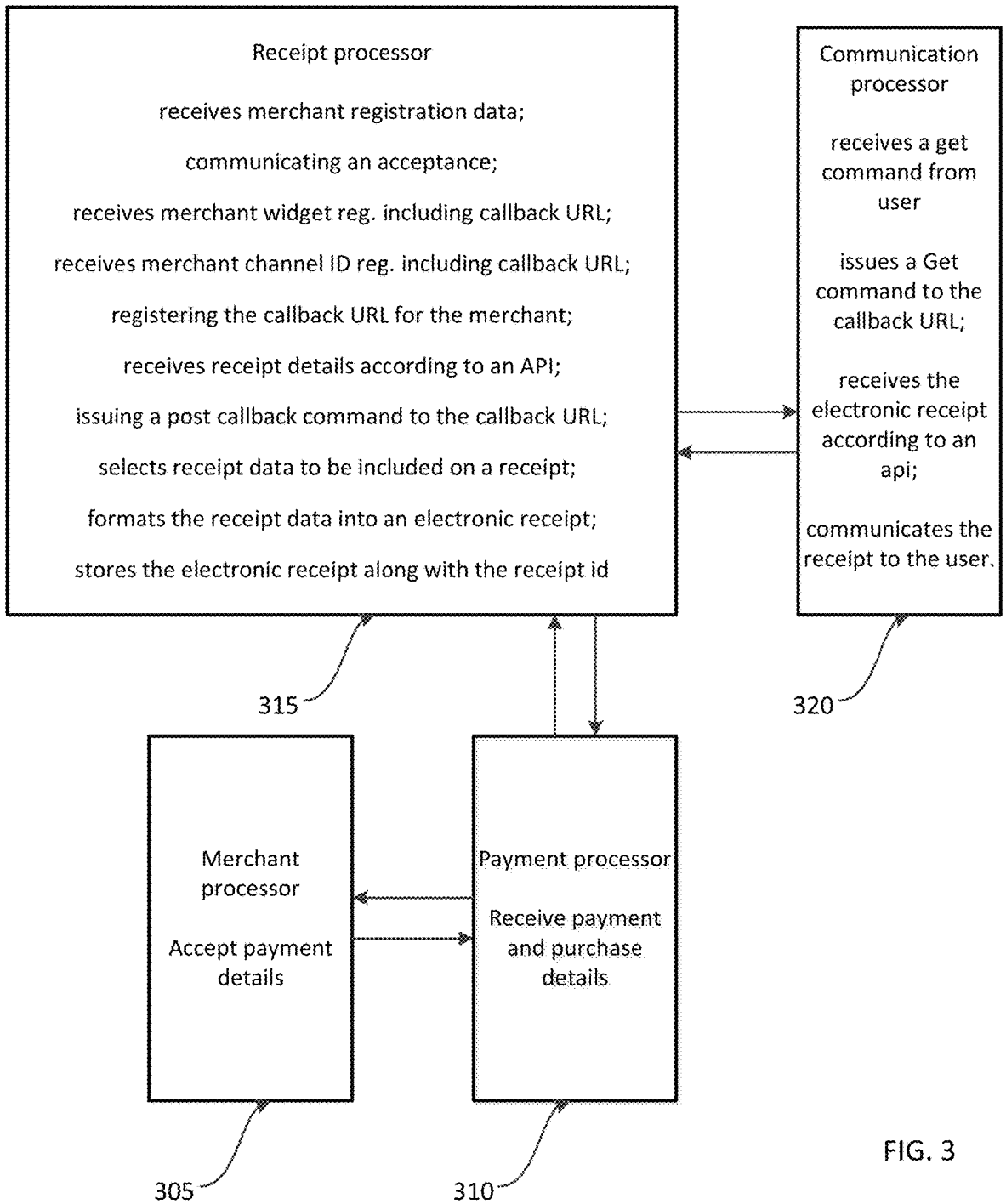
FIG. 3 may illustrate computing elements that may be used in one embodiment of the system.
Figure 4:
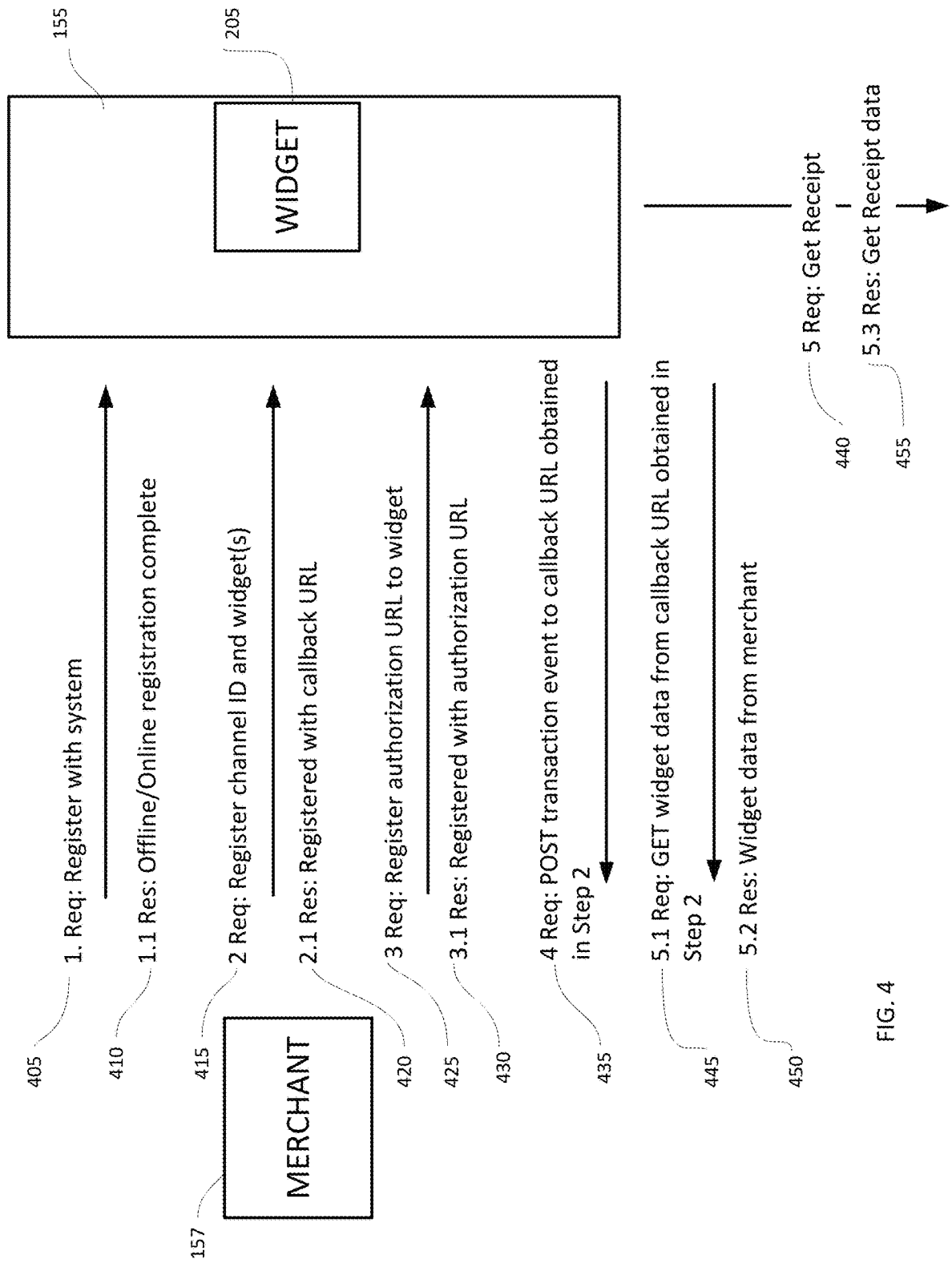
FIG. 4 may be an illustration of the computer executable blocks for a merchant to register with the receipt systems.

FIG. 3 may illustrate computing elements that may be used in one embodiment of the system. The flow of the computer executable blocks may be illustrated in FIG. 4. Referring to FIG. 3, a merchant processor or server 305 may accept payment details at a point of sale device, for example, and may communicate the details of the purchase and payment to a payment processor 310. The payment processor or server 310 may receive the purchase and payment details and may communicate some of the detail to a receipt processor or server 315. The channel of purchase may include at least one of: a URL, a mobile access channel or a network communication channel and may represent the acceptable ways to reach the receipt system 155.

For example, a merchant 157 may indicate to the receipt processor 315 that it would like to take part in the receipt system (block 405). At block 410, in response to the registration data being approved, an acceptance may be communicated to the merchant 157. The acceptance may be based on the merchant being verified, being determined to be a member of the payment network and in good standing, etc.

At block 415, merchant widget registration data may be received by the receipt system. Logically, the data may be communicated to an application programming interface (API) which may be a set of rules used to communicate data in a standard, known format. The widget registration data may include a callback URL which may be used if a transaction occurs and a receipt may be generated. The callback URL may indicate a transaction happen or the callback URL may be used to retrieve data. In some embodiments, one URL may be used for notification of a transaction and a second URL may be used for retrieving widget data. Similarly, the widget registration data may include merchant channel ID registration data which may include a callback URL. The callback URL may be the same or may be different depending on the specific design of the system. The widget data may be used to register the merchant with one or more of the widgets that may be available. Sample widgets may include warranty widgets, loyalty widgets, offer widgets, etc. At block 420, in response to receiving the widget registration data and merchant channel registration data, the callback URL for the merchant may be registered with the receipt system.

At block 425, in some embodiments, a merchant may also register authorized users of the receipt system. The authorized users may be trusted parties of the merchant such as customers that may desire to have access to the electronic receipt system. Logically, the data may be communicated according to an application programming interface (API) which may be a set of rules used to communicate data in a standard, known format. Assuming the registration is successful, the authorized users and related URL may be registered with the system.

In response to receiving the receipt data, the system at block 435 may issue a post callback command to the callback URL. A POST command may communicate a message in a known format to the merchant 157 (or other authorized users) that an event has occurred which may generate a receipt. The URL may be configured to accept the command and respond according to preset rules.

At block 440, the merchant 157 may select to get a receipt 905 from the system. The execution of receiving the receipt data may occur in a variety of ways. In one embodiment, the merchant 157 may issue a GET command from the callback URL to the rich receipt widget 205 in the rich receipt system 155. As mentioned previously, there may be more than one callback URL, such as one to notify the parties that a transaction has occurred and a second to actually pass the relevant data or information that may be used on the electronic receipt 905.

At block 445, the system may issue a GET command from the callback URL to request widget data. As mentioned previously, there may be a plurality of widgets and the GET request may be to one or more specific widgets. The receipt system may at block 450, respond with appropriate widget data. For example, the system may inquire of a loyalty widget if this coffee purchase is the tenth coffee purchase which would mean the coffee should be free. The reward widget may respond with the appropriate information.

At block 455, the merchant may respond with the receipt data requested at block 440. In one embodiment, the rich receipt system 155 may select receipt data to be included on a receipt, may format the receipt data into an electronic receipt according to receipt format rules, may store the electronic receipt along with the receipt id and may communicate the receipt data to the communication server 320.

In some embodiments, the GET commands may be handled by the receipt server 315. In other embodiments, the GET commands may be handled by a communication server 320.

The receipt may contain a variety of details depending on the requestor, the merchant, the user and the type of sale. For example, a the user may select to have loyalty data from a loyalty widget and offer data from an offer widget included on a receipt from a given merchant (or from all merchants). Rules and formats may be set up in advance such that the receipts may follow a common format, with the format being modifiable by the user.

FIGS. 9-16 illustrate various formats of receipts 905 and how user interfaces may be used to format receipts 905. In some embodiments, the receipt 905 may contain a unique code 910 which may be used to recall the details of the transaction at a point in time in the future. In some embodiments, the unique code may be a URL which may be used to access the receipt.

Figure 9:
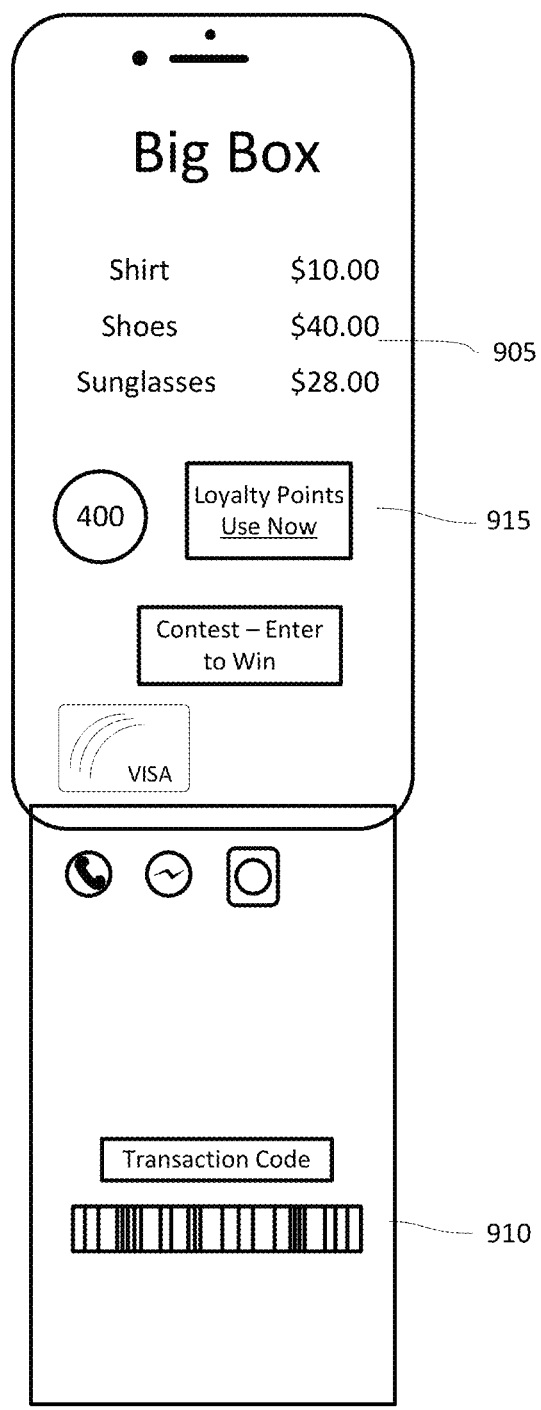
FIG. 9 may be an illustration of a sample computer generated receipt.
Figure 10:
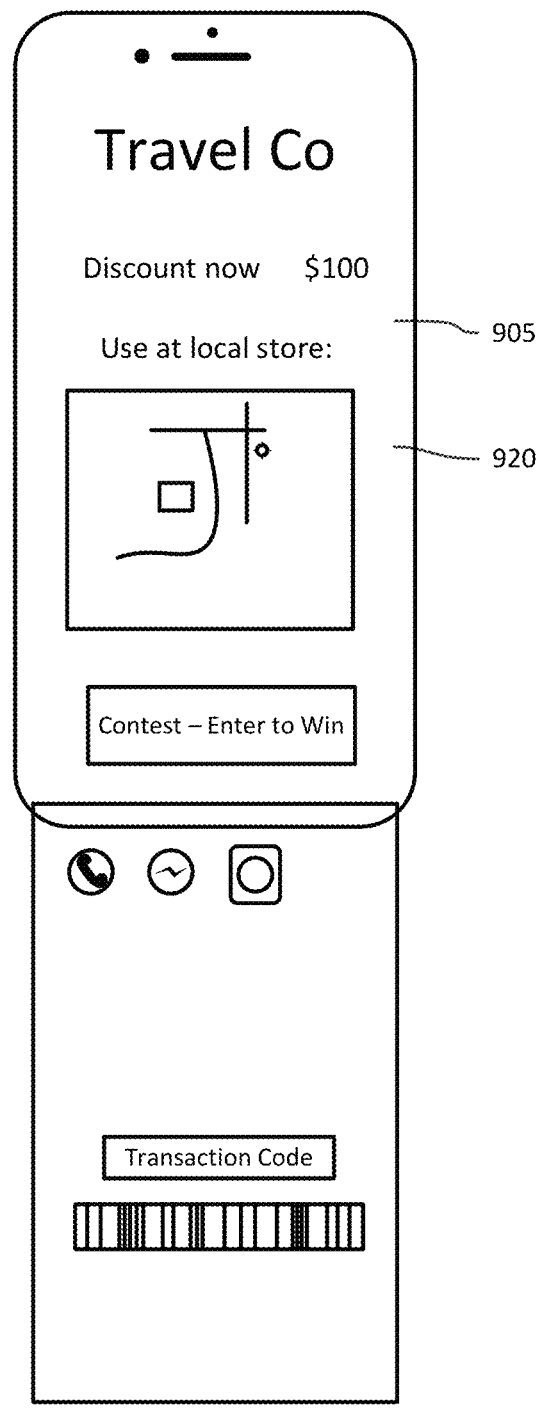
FIG. 10 may be an illustration of a sample computer generated receipt.
Figure 11:
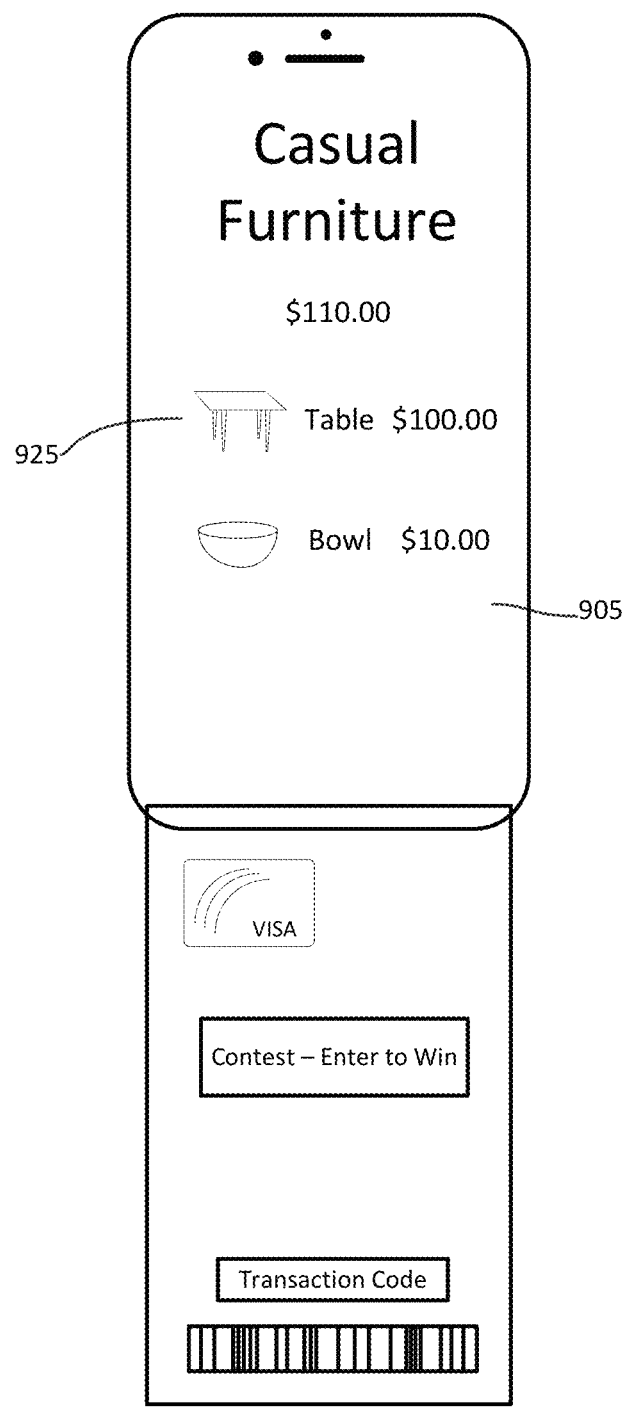
FIG. 11 may be an illustration of a sample computer generated receipt.
Figure 12:
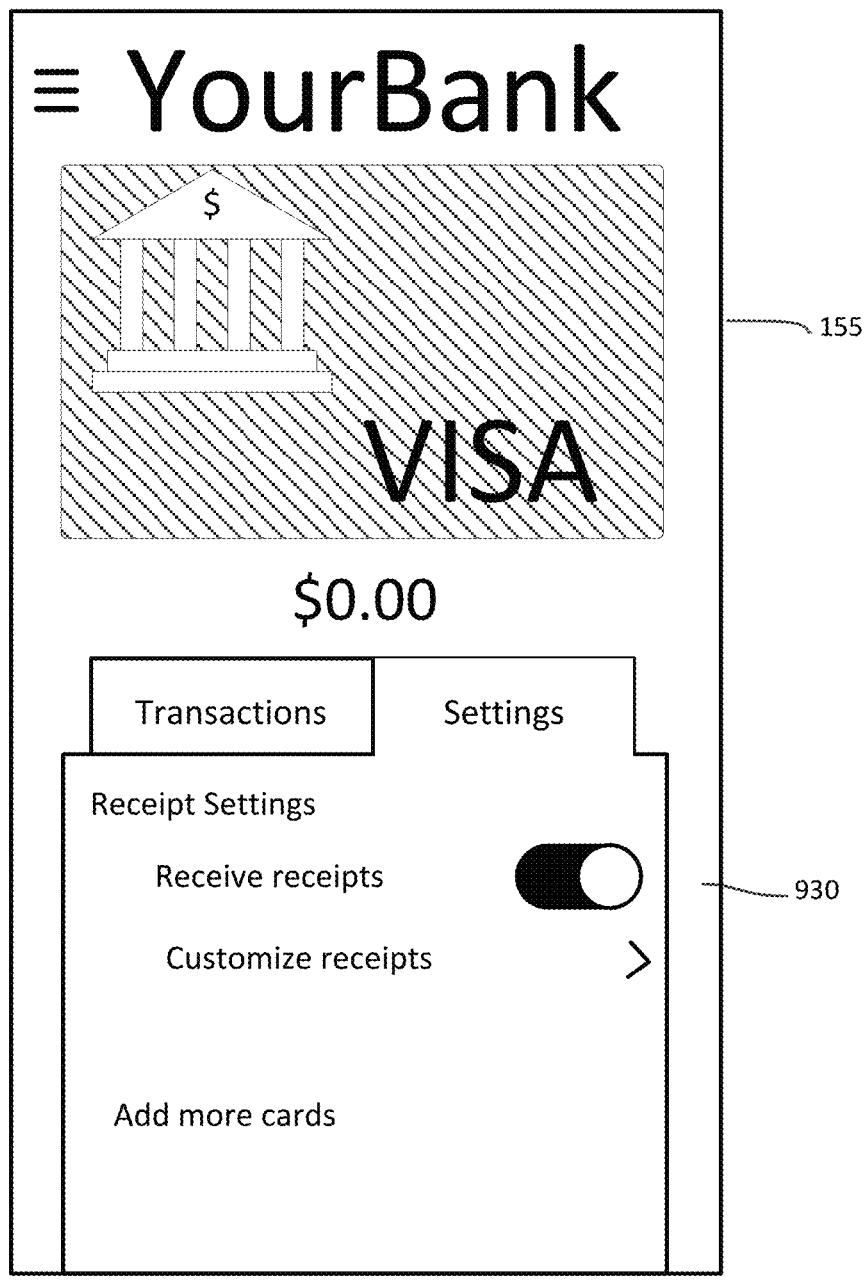
FIG. 12 may be a user interface for selecting an electronic receipt.
Figure 13:
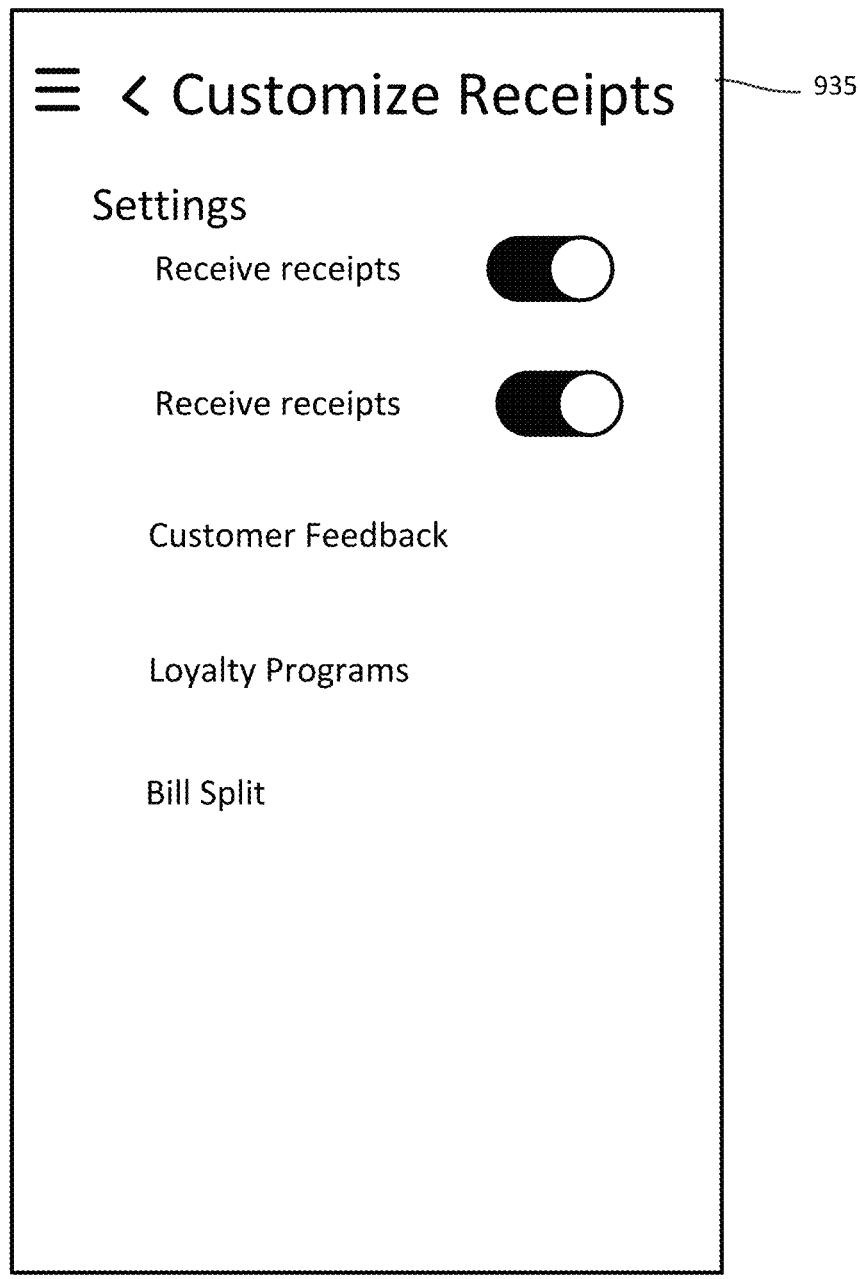
FIG. 13 may be a user interface to customize electronic receipts.
Figure 14:
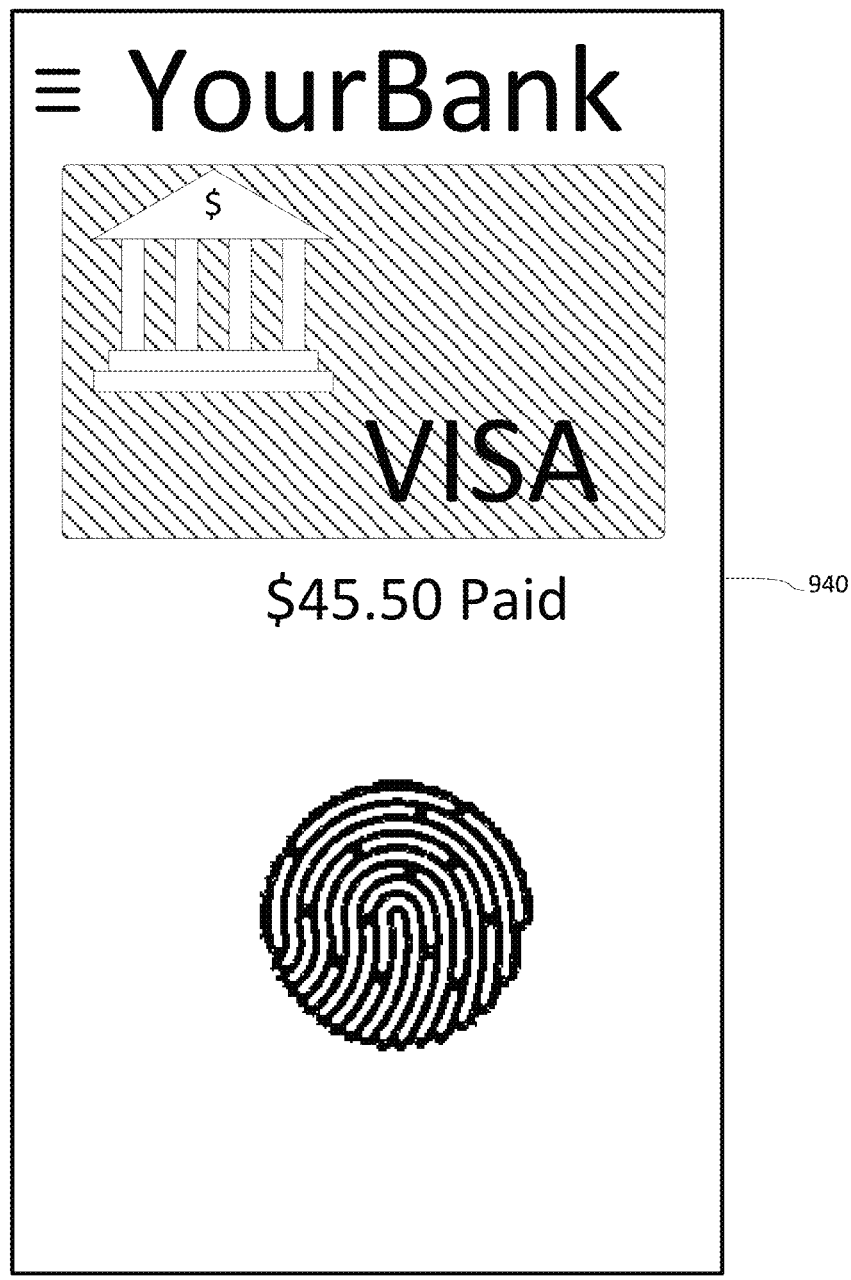
FIG. 14 may be an illustration of a sample computer generated receipt.
Figure 15:
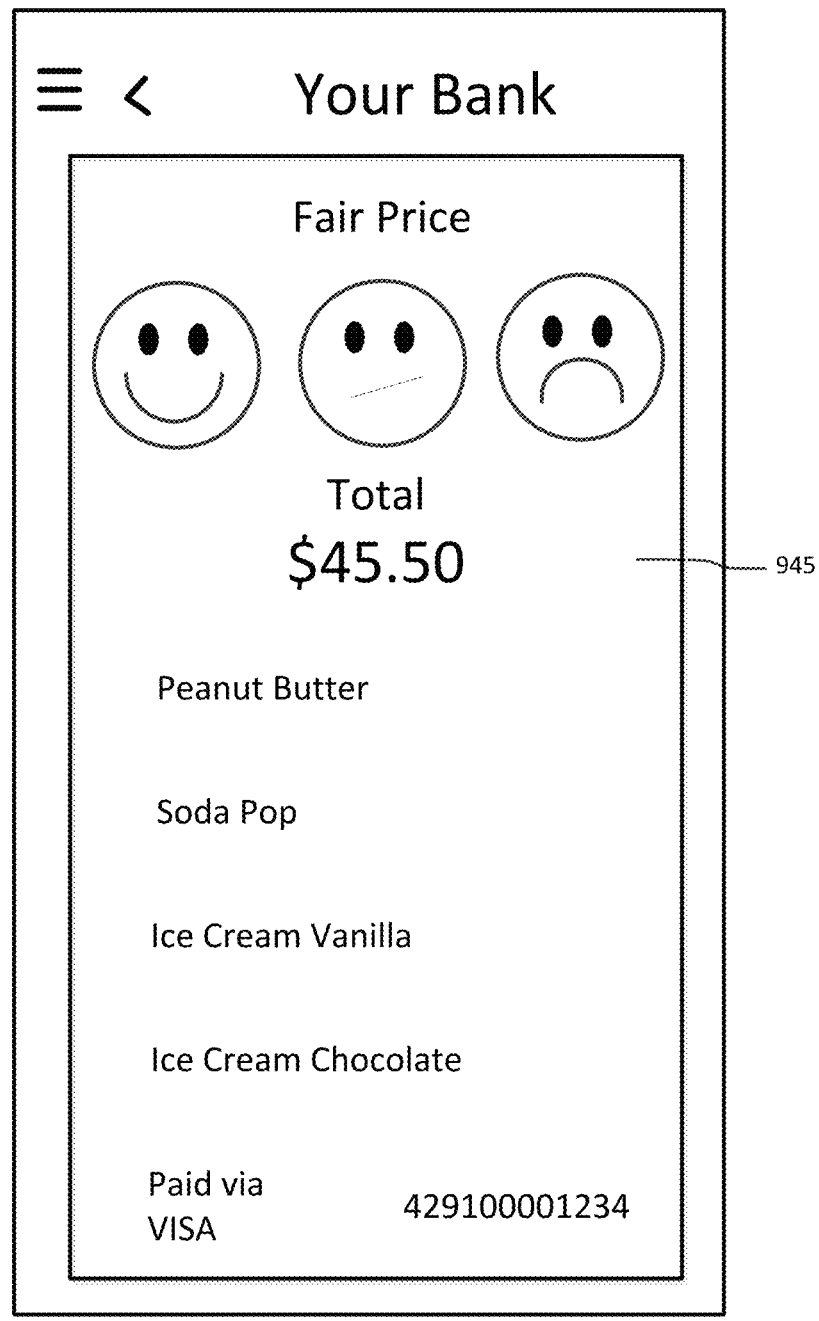
FIG. 15 may be an illustration of a sample computer generated receipt.
Figure 16:
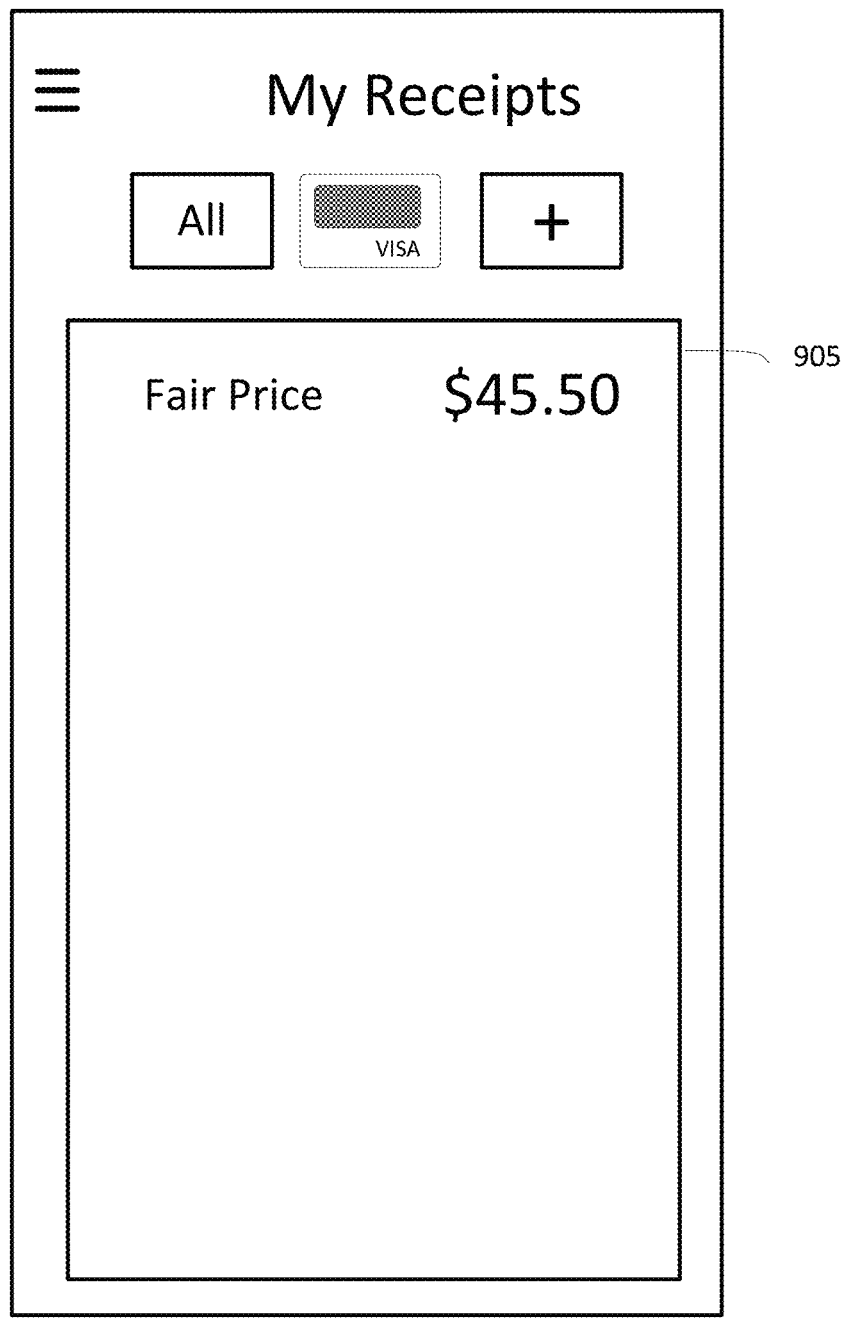
FIG. 16 may be an illustration of a sample computer generated receipt.

FIG. 9 may illustrate a receipt 905 with a unique code 910 and a display of loyalty points 915 from a loyalty widget for this merchant 157. FIG. 10 may illustrate a receipt 905 with a discount at a certain location 920 illustrated from a discount widget. FIG. 11 may be a receipt 905 with illustrations of the items purchased 925. FIG. 12 may illustrate a user interface where users can select 930 to receive computer receipts 905 from a receipt widget 205 and FIG. 13 may be an illustration of a user interface 935 where a user can customize receipts 905. FIG. 14 may be an illustration of a base receipt 940 and with a sign in via a fingerprint, a more detailed receipt 945 such as the receipt in FIG. 15 may be displayed. FIG. 16 may illustrate the ability to review past receipts 905.

Figure 5:
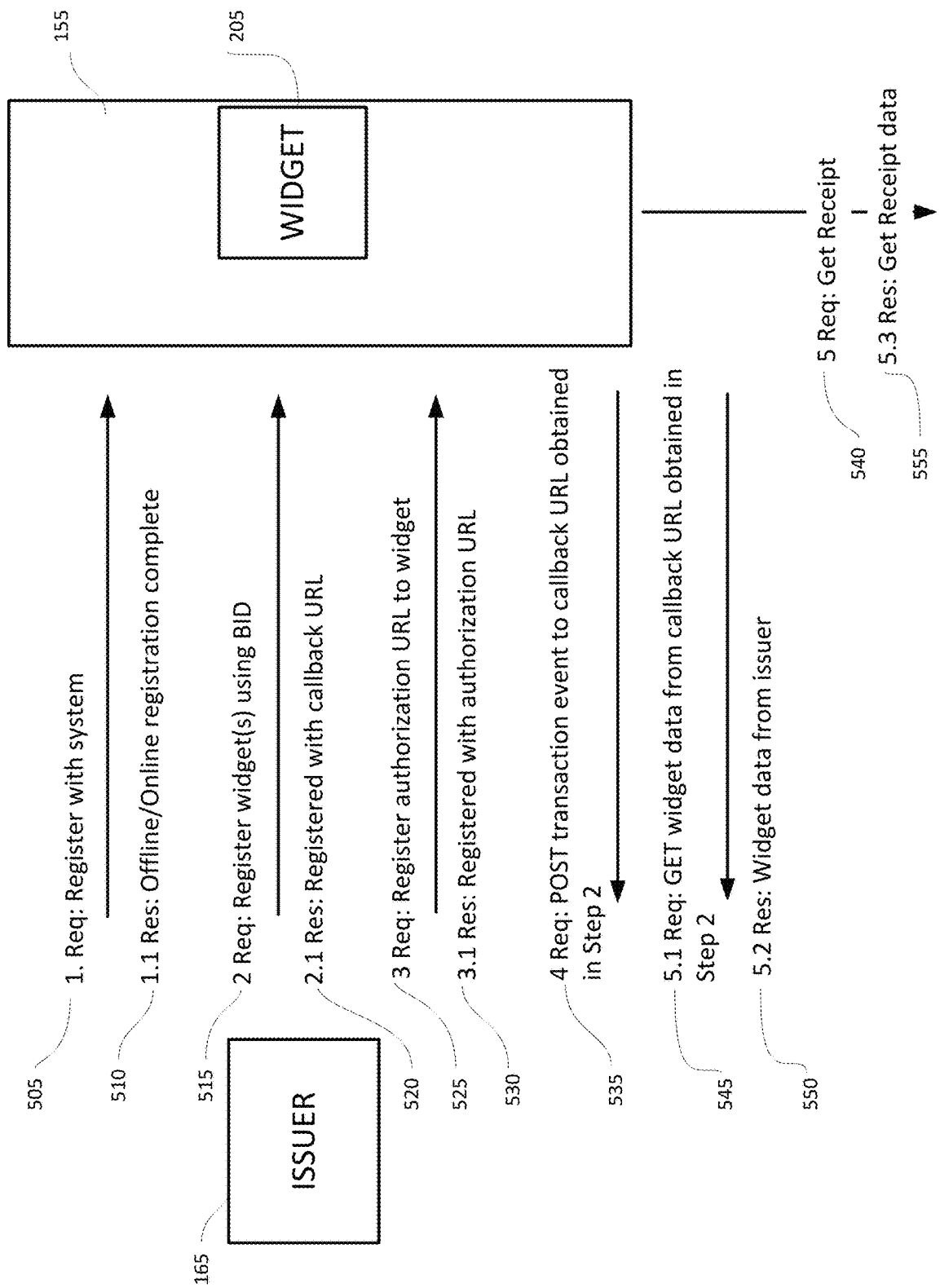
FIG. 5 may be an illustration of the computer executable blocks for an issuer to register with the receipt systems.

Referring now to FIG. 5 which may illustrate an issuer 165 registering and using the rich receipt platform 155. It should be noted that the registration process ensures that different publishers (or widget owners) can see only their own data or data they have licensed from other publishers. No single party other than users can see all the data. In addition, bank to consumer communications AND merchant to consumer communications may appear on the SAME receipt.

At block 505, the issuer 165 may register with the rich receipt platform 155. The registration may happen online or offline and may happen in advance of using the rich receipt system. At block 510, the rich receipt system 155 may indicate to the issuer that the registration is complete or has been successful. At block 515, the issuer 165 may register with the desired widgets 205 using account numbers or business id numbers (BID) and a callback URL. At block 520, the system may respond that the callback URL has been registered.

In some embodiments, the issuer 165 may register authorization for others to use the widgets at block 525. Assuming the authorization was successful, the issuer 165 may be notified that the additional parties have been successfully added to the widget and the URL has been registered with the widget. At block 535, a POST even may occur which may be in result of a transaction occurring related to a registered account. The POST may be communicated to the registered URL. In response, the issuer 165 may issue a GET receipt command to the rich receipt platform 155 at block 540. In addition, at block 545 the issuer 165 may issue a GET command to the registered widget from the URL that was registered previously. In response, the widget data may be returned to the issuer 165 at block 545. Similarly, the rich receipt system 155 may return the receipt data at block 555.

Figure 6:
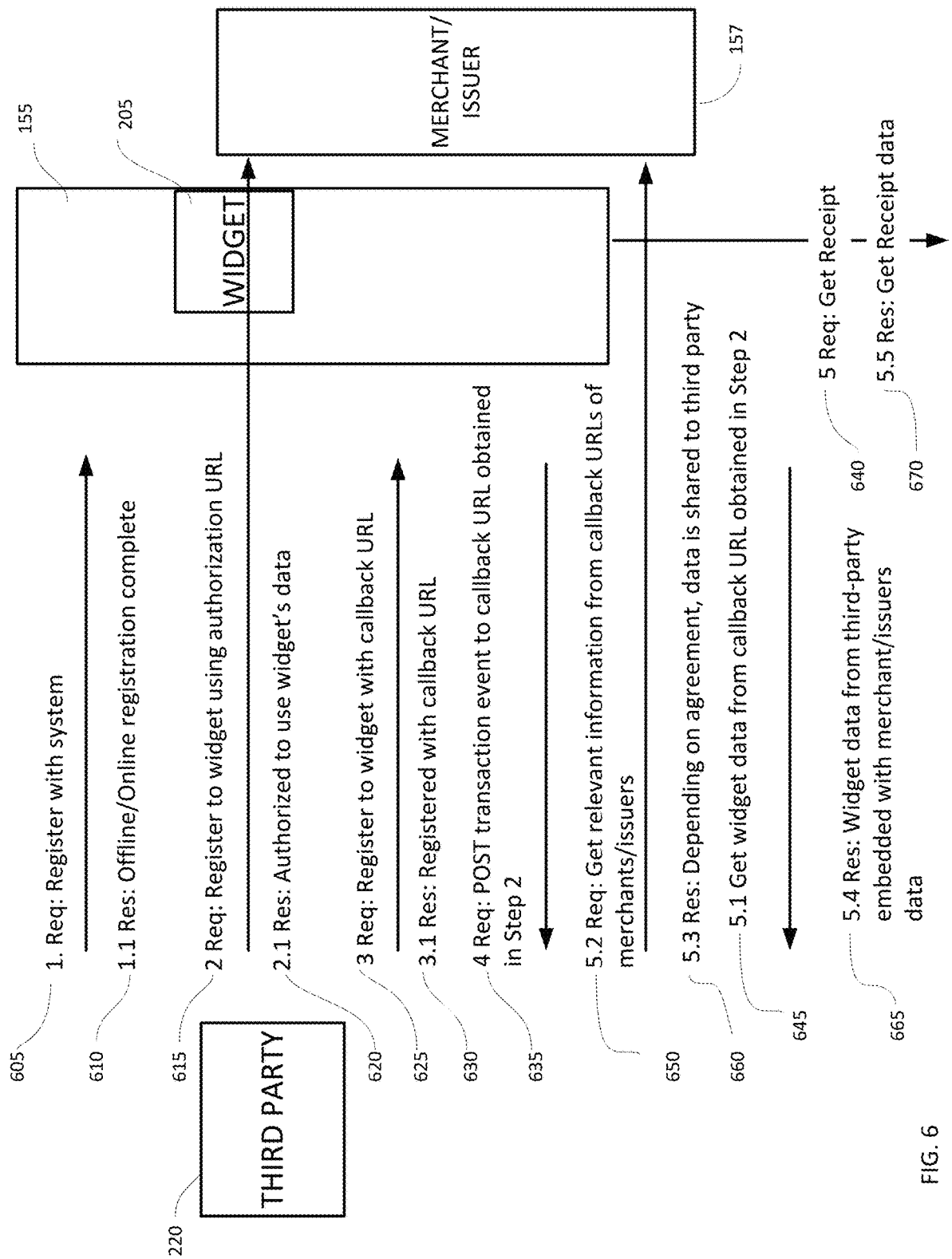
FIG. 6 may be an illustration of the computer executable blocks for an third party to register with the receipt systems.

FIG. 6 may illustrate a situation where a third party may register with the rich receipt platform 155. At block 605, the third party 220 may register with the rich receipt platform 155. The registration may happen online or offline and may happen in advance of using the rich receipt system 155. At block 610, the rich receipt system 155 may indicate to the third party 220 that the registration is complete or has been successful. At block 615, the merchant 157 may register with the rich receipt system 155 using an authorization URL. At block 620, if the URL is accepted, the rich receipt system 155 may communicate a response that the use has been authorized.

At block 625, the third party 220 may register with the desired widgets 205 using account numbers or business id numbers (BID) and a callback URL. At block 630, the system may respond that the callback URL has been registered.

At block 635, a POST even may occur which may be in result of a transaction occurring related to a registered account. The POST may be communicated to the registered URL. In response, the third party 220 may issue a GET receipt command to the rich receipt platform 155 at block 640. In addition, at block 645 the third party 220 may issue a GET command to the registered widget from the URL that was registered previously. In response, the widget data may be returned to the third party 220 at block 645. At block 650, relevant information for the receipt may be obtained from the merchant using the callback URL and at block 660, assuming the third party has permission, the requested data may be shared from the merchant 157 to the third party 220. Similarly, the rich receipt system 155 may return the receipt data at block 670.

Users can subscribe to the service 155 as a whole, and choose which widgets they want to/don't want to see. For example, some users may not care about loyalty points and they may select to not receive data from loyalty widgets. Similarly, some users may want to know about warrantees only and the users make indicate such preferences in the various menus when the users subscribe to the system 155. The widgets may be for all merchants or for some merchants.

An account transaction may begin the receipt process. The account may be virtually any account, including a credit card, a debit card, an airline miles account, a loyalty point account, a stock account, etc. What appears on the receipt 905 may depend on the selections made as part of the rich receipt registration. For example, some users could care less about loyalty points and the receipts 905 for such users may be more traditional and only list goods/services and prices. Other users may set up the receipt operating system 155 to include more information including warrantee and loyalty information as that user may be more comfortable tracking electronic receipts. The appearance of the receipt 905 may be user specific and may be set up according to a series of questions or menus that allow a user to select from the receipt operating system exactly what information they would like to see on the electronic receipt such as illustrated in FIG. 13.

Figure 7:
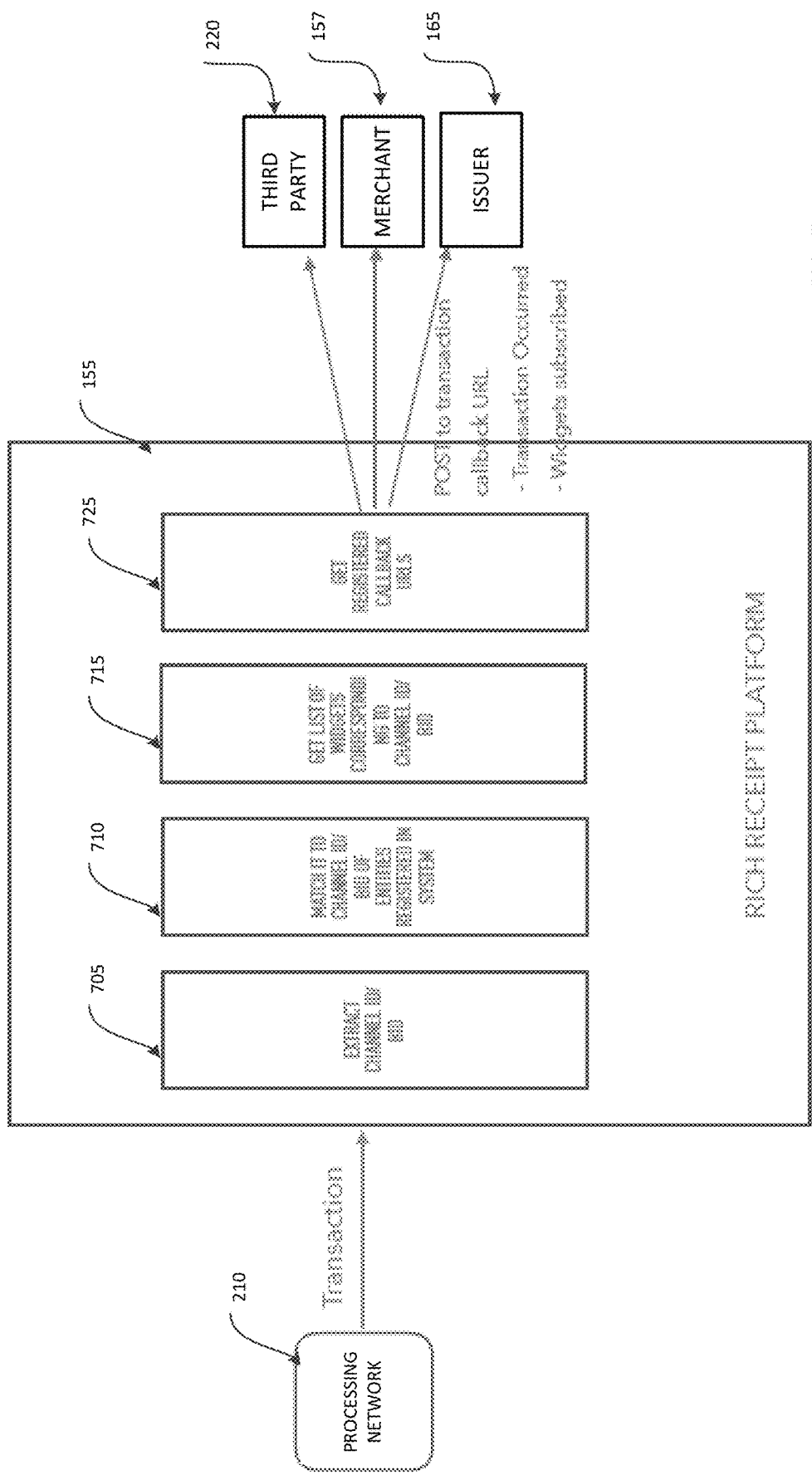
FIG. 7 may be an illustration of computer executable blocks that may be illustrated by transaction triggered events.

FIG. 7 may illustrate some sample computer executable blocks that may be executed inside the rich receipt platform 155 when a transaction occurs involving a registered account. At block 705, the channel id and BID or account identifier may be extracted from the transaction. At block 710, the BID and channel ID may be matched to entities already registered in the rich receipt system 155. If there is a match determined at block 710, a list of widgets may be determined that correspond to the channel ID and BID. At block 725, assuming there are matches from the widgets and the channel ID and BID, the registered callback URL may be used to notify the relevant parties such as the third party 220, the merchant 157 and the issuer 165 via a POST command that a transaction has occurred and that receipt data is available. As mentioned previously, there may be one URL for transaction notices and a second URL for obtaining the details of the transaction. In other embodiments, a single URL can be used for notices and details.

Figure 8:
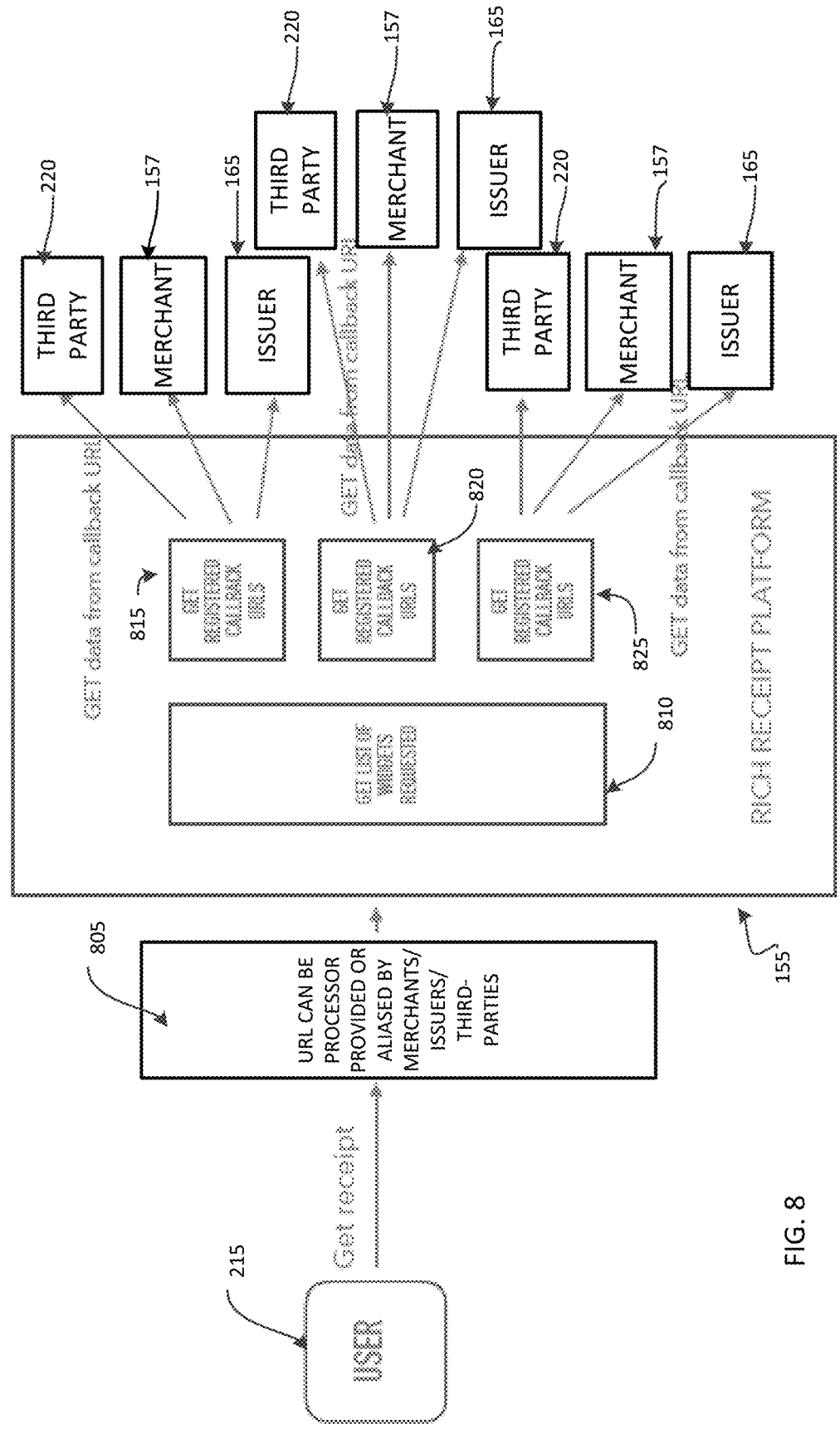
FIG. 8 may be an illustration of computer executable blocks that may be illustrated by get receipt triggered events.

At FIG. 8, a user may attempt to obtain a receipt 905. The user 215 may access a URL from a merchant 157 or an issuer 165 or even another third party 220. The URL may access the rich receipt platform 155 where a list of widgets requested by the user may be determined at block 810. At blocks 815, 820 and 825, the registered callbacks URLs for the various widgets may be used to get callback data from the various parties including issues 165, merchants 157 and third parties 220.

Widgets may have an architecture format. Below may be a sample format and relevant definitions:
WIDGET ARCHITECTURE
Widget Identifier, Name, Type
Consumer type: MERCHANT/ISSUER/THIRD-PARTY
Transaction callbacks: To be provided by MERCHANT/ISSUER/THIRD-PARTY
   URL: a valid URL which is notified in lieu of transaction event
   Authorization headers: for authenticating the source
   Methods supported:
     POST—to notify in event of a transaction
     GET—to get widget related data when a receipt is requested by VISA/THIRD-PARTY
Authorization callbacks: To be provided by MERCHANT/ISSUER
   URL: a valid URL where third-party can authorize themselves to use a widget data
   Authorization headers: for authenticating the source
A sample widget may be a total widget as described below:
TOTAL WIDGET
   This widget can be generated by an account processor without the need of merchant 157, issuers 165 and third-parties 220.
TRANSACTION ID
LAST 4 OF CARD
TRANSACTION DATE/TIME
CURRENT SPEND
SPEND PERIOD

FRAUD URL

Another widget may be a PERMISSION MODEL WIDGET.

The permission model widget may be a hidden widget that controls information sharing between widgets and merchants/issuers/3rd parties. It may allow content providers to determine what is shared and with whom it is shared. It may allow control at the widget (share all/share none) and individual data item level PERMISSION MODEL WIDGET
PROVIDER NAME
WIDGET NAME
SHARED
SHARED WITH
[TAG1/SHARED/SHARED WITH,
TAG2/SHARED/SHARED WITH]

Another widget is a TRANSACTION DETAILS WIDGET as described below:

TRANSACTION ID
TERMINAL ID
TRANSACTION DATE AND TIME
TRANSACTION DESCRIPTION
TRANSACTION AMOUNT
TRANSACTION CURRENCY
TRANSACTION MODE—(CASH/CREDIT/DEBIT/OTHERS)
QR CODE/BAR CODE

A merchant info widget may be used to provide data about a merchant. It may be described as below:

MERCHANT INFO WIDGET
NAME
LOCATION
LOGO
PHONE/FAX NUMBER(S)
EMAIL ADDRESS(ES)
SOCIAL PLATFORM(S)—FACEBOOK/TWITTER/WECHAT ETC. OPERATING HOURS

An itemized list widget may provide an itemized list in response to a request as described below:

Itemized List Widget
ITEM ORDER IN LIST
SKU/SKU VARIANT
NAME DESCRIPTION
LONG DESCRIPTION
NUMBER
PRICE
SUB TOTAL
ITEM IMAGE
RE-ORDER URL There may be several issue widgets. In a permission model, the following widgets may exist:

Issuer widget common metadata—theme
Issuer info
Transaction history
Benefits
Loyalty
Offers Logically, there may be third party widgets. Some sample widgets include:

Ratings/feedback
Offers
Benefits
Warranties

Figure 17:
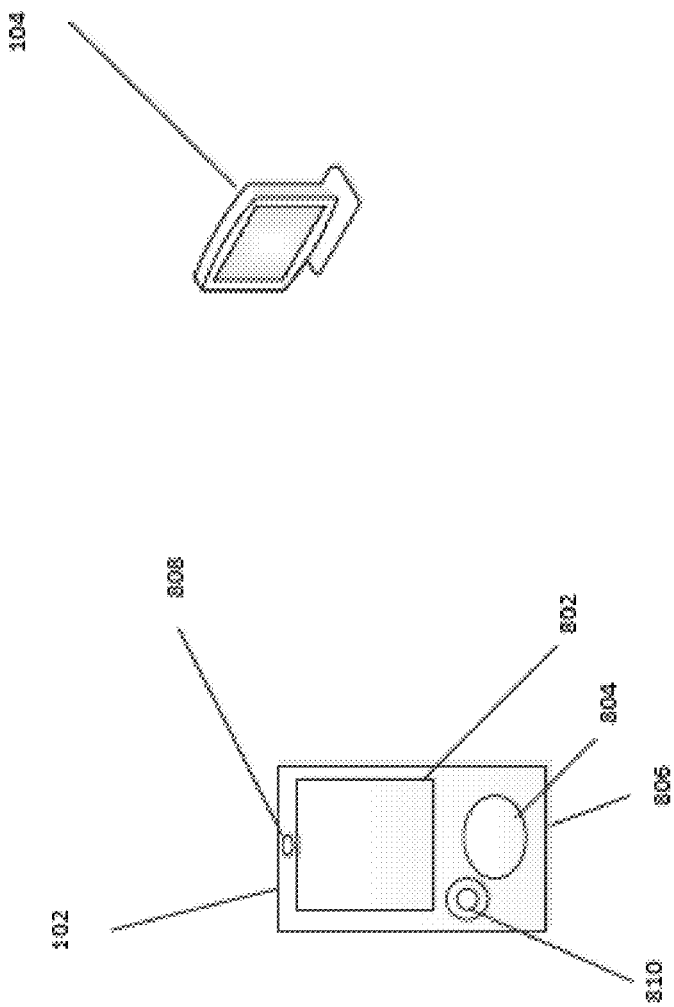
FIG. 17 may be an illustration of a sample computing environment.

FIG. 17 may be a high level illustration of some of the elements a sample computing environment that may be physically configured to implement the various embodiments of the method and its logical variants. A user device 102 in the computing environment may store a software payment application that may be accessed in a variety of ways. There may be various versions of the application to take advantage of the benefits of different computing devices, different languages and different API platforms. In some embodiments, the entire system 103 may be accessed through a portable computing device 102 such as a smart phone and the desired activities directed toward clients may occur using a portable computing device 102.

The user device 102 may have a display 802 which may or may not be a touch sensitive display. More specifically, the display 802 may have a capacitance sensor, for example, that may be used to provide input data to the user device 102. In other embodiments, an input pad 804 such as arrows, scroll wheels, keyboards, etc., may be used to provide inputs to the user device 102. In addition, the user device 102 may have a microphone 806 which may accept and store verbal data, a camera 808 to accept images and a speaker 810 to communicate sounds.

Figure 18:
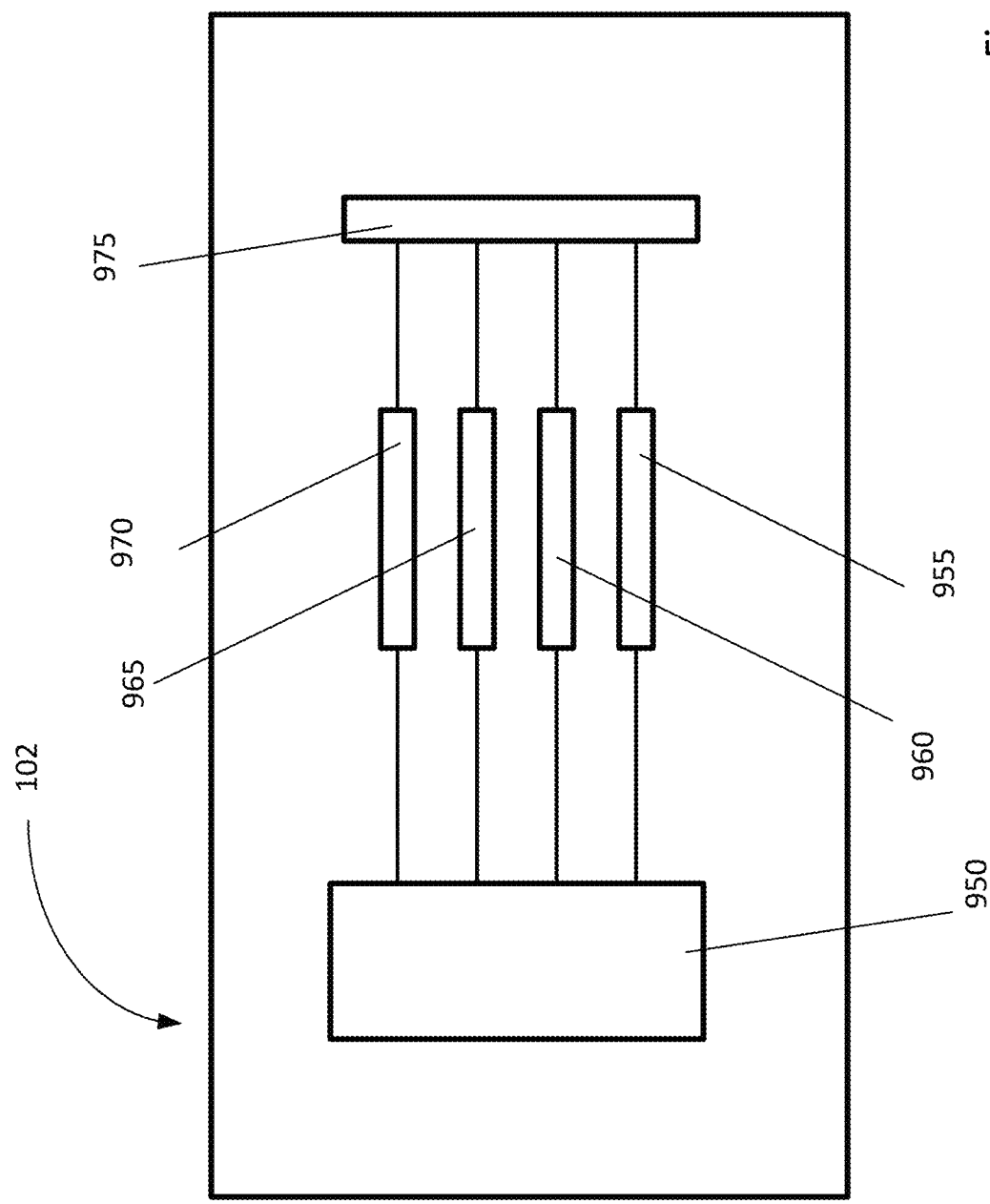
FIG. 18 may be an illustration of the elements of a sample portable computing device.

The user device 102 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the server 104 or through a wireless network, e.g., Bluetooth, etc. FIG. 18 may be a simplified illustration of the physical elements that make up a user device 102 and FIG. 19 may be a simplified illustration of the physical elements that make up the server 104.

FIG. 18 may be a sample user device 102 that is physically configured according to be part of the system. The user device 102 may have a processor 950 that is physically configured according to computer executable instructions. It may have a portable power supply 955 such as a battery which may be rechargeable. It may also have a sound and video module 960 which assists in displaying video and sound and may turn off when not in use to conserve power and battery life. The user device 102 may also have volatile memory 965 and non-volatile memory 970. There also may be an input/output bus 975 that shuttles data to and from the various user input devices such as the microphone 906, the camera 908 and other inputs 902, etc. It also may control communicating with the networks, either through wireless or wired devices. Of course, this is just one embodiment of the portable computing device 102 and the number and types of portable computing devices 102 is limited only by the imagination.

An example of the physical elements that make up a server 104 such as the receipt server 315 or communication server 320 further illustrated in FIG. 19. Some of the physical elements may be located in other devices, depending on processing needs. The server 104 may have a processor 1000 that is physically configured according to computer executable instructions. It may also have a sound and video module 1005 which assists in displaying video and sound and may turn off when not in use to conserve power and battery life. The server 104 may also have volatile memory 1010 and non-volatile memory 1015. And as mentioned previously, each server may be physically built to meet the specific identified task.

In some examples, the server 104 may include digital storage such as a magnetic disk, an optical disk, flash storage, non-volatile storage, etc. Structured data may be stored in the digital storage such as in a database. A database 1025 may be stored in the memory 1010 or 1015 or may be separate. The database 1025 may also be part of a cloud and may be stored in a distributed manner. There also may be an input/output bus 1020 that shuttles data to and from the various user input devices such as the microphone 806, the camera 808, the inputs 804, etc. The input/output bus 1020 also may control communicating with the networks, either through wireless or wired devices. Of course, this is just one embodiment of the server 104 and the number and types of user devices 102 is limited only by the imagination.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

The user devices, terminals, computers and servers described herein may be general purpose computers that may have, among other elements, a microprocessor (such as from the Intel Corporation, AMD or Motorola); volatile and non-volatile memory; one or more mass storage devices (i.e., a hard drive); various user input devices, such as a mouse, a keyboard, or a microphone; and a video display system. The user devices, terminals, computers and servers described herein may be running on any one of many operating systems including, but not limited to WINDOWS, UNIX, LINUX, MAC OS, or Windows (XP, VISTA, etc.). It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, terminals, computers and servers described herein may communicate via networks, including the Internet, WAN, LAN, Wi-Fi, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, terminals, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above can be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it will be understood by those of ordinary skill in the art having the present specification, figures and claims before them, that the corresponding structure is a general purpose computer, processor, or microprocessor (as the case may be) programmed to perform the particularly recited function using functionality found in any general purpose computer without special programming and/or by implementing one or more algorithms to achieve the recited functionality. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one of the inventions to the embodiments illustrated.

The present disclosure provides a solution to the long-felt need described above. In particular, the systems and methods described herein may be configured for improving data transfer. Further advantages and modifications of the above described system and method will readily occur to those skilled in the art. The disclosure, in its broader aspects, is therefore not limited to the specific details, representative system and methods, and illustrative examples shown and described above. Various modifications and variations can be made to the above specification without departing from the scope or spirit of the present disclosure, and it is intended that the present disclosure covers all such modifications and variations provided they come within the scope of the following claims and their equivalents.

The invention claimed is:

1. A centralized computer system for creating electronic receipts, the computer system comprising:
   a merchant processor associated with a merchant, wherein the merchant processor accepts payment details and communicates the payment details to a payment processor;
   the payment processor that receives payment details; a receipt processor that: receives merchant registration data from the merchant processor;
   in response to the merchant registration data being approved, communicates an acceptance to the merchant processor;
   receives merchant widget registration data from the merchant processor, the merchant widget registration data comprising a callback URL for the merchant and a selection of at least one widget of a plurality of widgets, wherein the at least one widget is configured to provide widget data related to a widget function;
   receives merchant channel ID registration data comprising the callback URL;
   in response to receiving the merchant widget registration data and the merchant channel ID registration data, registers the callback URL for the merchant;
   receives receipt details associated with a transaction with the merchant, the receipt details being received according to an API;
   in response to receiving the receipt details, issues a POST callback command to the callback URL indicating to the merchant that the transaction has occurred and issues a GET command to the at least one widget of the plurality of widgets; in response to issuing the GET command to the at least one widget, receives updated widget data from the at least one widget;
   selects receipt data from the receipt details to be included on a receipt based at least partially on the selection of the at least one widget and the updated widget data;
   formats the receipt data into an electronic receipt according to receipt format rules; stores the electronic receipt along with a receipt ID-id; and a communication processor which:
   receives a GET command from a user; in response to receiving the GET command from the user, issues a GET command to the callback URL; receives the electronic receipt according to an API; and communicates the receipt to the user.

2. The computer system of claim 1, further comprising— registering an additional authorization URL to a widget of the plurality of widgets; and in response to the additional authorization URL, registering the additional authorization URL in the widget.

3. The computer system of claim 1, wherein the receipt comprises a unique code.

4. The computer system of claim 3, wherein the receipt may be retrieved using the unique code.

5. The computer system of claim 3, wherein the unique code is a URL.

6. The computer system of claim 1, wherein the merchant channel ID registration data comprises at least one of: a URL, a mobile access channel or a network communication channel.

* * * * *